United States Patent [19]

Johnson

[11] Patent Number: 4,499,911
[45] Date of Patent: Feb. 19, 1985

[54] ENERGY EFFICIENT CURING AND DRYING SYSTEM

[76] Inventor: William H. Johnson, 4000 Brothwell Ct., Raleigh, N.C. 27606

[21] Appl. No.: 214,772

[22] Filed: Dec. 9, 1980

[51] Int. Cl.³ .......................... A24B 3/10; A24B 3/12
[52] U.S. Cl. .................................. 131/302; 131/303; 34/35; 34/86; 34/93
[58] Field of Search .............................. 131/300–306; 34/35, 86, 93

[56] References Cited

U.S. PATENT DOCUMENTS

| | | | |
|---|---|---|---|
| 2,529,621 | 11/1950 | Mayo | 34/93 |
| 3,231,986 | 2/1966 | Touton | 34/93 |
| 3,866,334 | 2/1975 | Huang | 34/93 |
| 4,069,593 | 1/1978 | Huang | 34/93 |
| 4,109,395 | 8/1978 | Huang | 34/93 |
| 4,114,288 | 9/1978 | Fowler | 34/93 |
| 4,189,848 | 2/1980 | Ko et al. | 34/93 |
| 4,192,323 | 3/1980 | Horne | 131/303 |
| 4,255,870 | 3/1981 | Malmquist | 34/35 |
| 4,263,721 | 4/1981 | Danford | 34/86 |

FOREIGN PATENT DOCUMENTS 132565  7/1951  Switzerland .......................... 34/93

OTHER PUBLICATIONS

*System Features Solar Collection, Heat Recycling*, Winter, Spring 1979, by W. H. Johnson.
ASAE Paper No. 79-3568, "Solar Energy and Heat Recycling in Tobacco Curing", Dec. 11-14, 1979.

Primary Examiner—V. Millin
Attorney, Agent, or Firm—Bell, Seltzer, Park & Gibson

[57] ABSTRACT

Significant amounts of heat energy, otherwise wasted in the curing and drying systems previously known, are recovered and recycled in the multi-chamber system of the present invention to thereby significantly increase efficiency and reduce fuel requirements. Tobacco or other moisture containing material is cured and dried in batches in a plurality of individual chambers, with each chamber having suitable controls for individually controlling the temperature and humidity conditions of the curing air which is circulated through the chamber. Means and methods are disclosed for recovering and recycling the heat content of the heated exhaust air from the respective chambers, for using solar energy for further heating the air, and for recovering and recycling the heat energy of the batch of material as it is cooled down at the end of the curing and drying cycle.

30 Claims, 6 Drawing Figures

ENERGY EFFICIENT CURING AND DRYING SYSTEM

FIELD OF THE INVENTION

This invention relates generally to a method and apparatus for more economically and efficiently drying a moisture-containing material, and is particularly applicable to the curing and drying of tobacco.

BACKGROUND OF THE INVENTION AND PRIOR ART

The curing of bright-leaf (or flue-cured) tobacco is particularly energy intensive, due to the large amount of moisture which must be removed from the freshly harvested leaf. Conventional tobacco curing methods are relatively inefficient, requiring an input of heat energy approximately three times that theoretically needed for vaporizing the moisture contained in the harvested leaf. Because of the high energy requirements in the curing process and the soaring fuel costs and frequent fuel shortages, there is considerable need for a more efficient method and means for curing bright-leaf tobacco which provides for a reduction in the energy required in the curing process.

The energy crisis has created considerable interest in using solar energy for on-farm drying of grain, tobacco and other crops, and various systems using solar energy for drying grain, peanuts, and tobacco have been proposed. Previous research on solar curing of flue-cured tobacco has involved curing the tobacco in a single chamber in a conventional manner, with solar heating being utilized to assist the furnace and thereby reduce fuel requirements. However, due to uneven energy demands during the curing cycle, such systems have been unable to effectively utilize the solar energy throughout the curing cycle.

In this regard, energy demand in the tobacco curing process differs at various phases during the curing cycle. During the first phase, which typically ranges from about 36 to 72 hours, the tobacco leaves undergo yellowing, and energy demand is relatively low, with the air temperature around 95°–105° F. and with high air recirculation and high relative humidity. After yellowing, the drying phase begins, and energy demand increases significantly as the curing air temperature is gradually increased up to about 165° to 170° F. with increased fresh air intake during most of the drying phase and with reduced air recirculation. The total drying phase, including leaf and stem drying, requires about 3 to 4 days with maximum fresh air intake at chamber temperatures between about 110° and 130° F. Considerable sensible heat is discharged from the exhaust vent during this phase.

A solar tobacco curing system disclosed in Huang U.S. Pat. No. 4,069,593 provides for storage of excess solar energy during the yellowing phase and utilization of the collected plus the stored energy during the subsequent drying phase when energy demands are greater. While energy requirements are reduced by this system in comparison with conventional bulk curing systems, curing equipment costs are higher due to the added energy storage system. Additionally, it is recognized that the stored energy cannot be fully utilized due to various losses.

Another recent development in tobacco curing systems is disclosed in Fowler U.S. Pat. No. 4,114,288. This system is designed to increase the efficiency of a bulk curing barn by using a solar collector for preheating incoming fresh air during daytime. Additionally, under certain conditions, heat is also recovered from the heated exhaust air discharged from the barn. However, even with this system, the operation of the bulk curing barn is still relatively inefficient. The heat recovery system and solar collector are useful primarily during the drying phase of curing when substantial amounts of heated air are exhausted from the curing chamber. At other times, e.g. during yellowing or during cool down and conditioning, these systems are essentially unused and provide no energy savings. Also with this system, a considerable quantity of heat energy is lost to the atmosphere at the end of the curing cycle when the cured and dried tobacco, at an elevated temperature of 165° F. or higher, is cooled to ambient temperature for removal from the curing barn.

It is an object of the present invention to provide a method and apparatus which is applicable to the curing of tobacco, and which is considerably more energy efficient than the systems heretofore proposed or commercially available.

A further object of this invention is to provide a more energy efficient curing and drying system which may also be utilized in the drying of other crops, such as corn, small grain and peanuts.

SUMMARY OF THE INVENTION

In the curing and drying system of the present invention, significant amounts of heat energy, otherwise wasted in the curing and drying systems previously known, are recovered and recycled to thereby significantly increase efficiency and reduce fuel requirements. Improvements in efficiency are also obtained by providing for solar heating of the incoming fresh air, and providing for immediate utilization of the solar energy and the recovered and recycled heat energy, without the necessity for energy storage.

In accordance with the present invention, tobacco or other moisture-containing material such as corn is cured and dried in batches in a plurality of individual chambers by circulation of heated air through each individual chamber while recovering heated exhaust air from the respective individual chambers. The curing and drying is carried out in such a manner that a substantial portion of the heat energy of the exhaust air recovered from the respective chambers can be recovered and used for preheating fresh air which is being supplied to one or more of the other chambers to thereby avoid energy loss and reduce the fuel requirements for heating the air.

The multi-chamber system of the present invention provides for major improvements in efficiency over the conventional single chamber systems of the prior art, with heat recovery and solar heating of incoming air for drying being significantly increased in comparison with a single chamber operation. For example, when tobacco in one of the curing chambers has been cured and dried, the tobacco can be cooled from its elevated temperature established during stem drying down to ambient temperature while heat energy is transferred to tobacco in one or more other chambers rather than being discharged to the atmosphere and wasted. The multi-chamber system further provides a novel conditioning method whereby the moisture removed from tobacco in one chamber is used directly to uniformly condition cured tobacco in another chamber, while the heat of adsorption evolved when the moisture is received by such tobacco is recovered and recycled.

The multi-chamber curing and drying apparatus of the present invention comprises a plurality of chambers, with each chamber being adapted for receiving tobacco or other material to be dried and cured, and each chamber having an air inlet and an air outlet for permitting a flow of air through the chamber. A furnace is provided for each of the chambers for directing a flow of heated air at an individually selected temperature into the chamber through its air inlet and into contact with the material which is disposed in the chamber. A common exhaust plenum is communicatively connected to the air outlet of each of the chambers for receiving the heated exhaust air from the respective chambers. A common inlet plenum is communicatively connected to the air inlet of each of the chambers for supplying fresh air to the respective chambers. A heat exchanger is connected to the common exhaust plenum and to the common inlet plenum and is constructed so that the flow of heated exhaust air comes into heat transferring relationship with the incoming fresh air for thereby preheating the incoming fresh air. The preheated fresh air, upon leaving the heat exchanger, can be directed through a solar collector for further heating before it is delivered to the respective chambers. At nighttime or during cloudy periods when solar heating is not available, the fresh air can be routed in bypassing relationship around the solar collector to avoid loss of heat as the air passes through the collector.

The heat recycling and recovery capabilities of the multi-chamber curing system of this invention provide particularly significant savings where the curing and drying schedules for the respective batches of tobacco or other material in the chambers are staggered timewise so that the batches are at different stages of drying and at different temperatures at any given time. This permits the heat content of the heated exhaust air from the warmer chambers to be effectively utilized by the other chambers which are then undergoing drying at a lower temperature.

The multi-chamber system of this invention also makes it possible to recover and reuse heat energy which is otherwise lost when the tobacco or other material has completed its curing and drying cycle at an elevated temperature and is cooled down to ambient temperature for removal from the curing or drying chamber. This is particularly advantageous in connection with the curing of tobacco, where it is necessary to condition the cured and dried tobacco leaves at the end of the drying cycle by restoring some moisture to the leaves. In accordance with the novel principles of the present invention, moist and cooler air which is exhausted from one of the other chambers is directed in a reverse direction to the normal air flow through the chamber where the cured and dried tobacco is located. This flow of moist air serves to cool and condition the tobacco leaves while the air becomes heated due to heat transfer from the warm tobacco and due to heat evolved during moisture adsorption by the tobacco. This heated air is recycled within the system and the heat energy reutilized in heating and drying tobacco in the other chambers.

The novel methods disclosed herein may be applied to the curing of tobacco in existing bulk curing units located side-by-side, or may be incorporated into unitary multi-chamber bulk curing facilities having common walls between chambers. The methods work equally well for updraft, downdraft, or crossflow curing systems. Furthermore, the multi-chamber systems with heat recovery and solar energy preheat, and the methods of recovering cool-down energy and heat of absorption energy can be applied in the drying of crops other than tobacco, such as corn, small grains, peanuts, and fruits for example.

BRIEF DESCRIPTION OF THE DRAWINGS

Some of the features and advantages of the invention having been stated, others will become apparent as the description proceeds, when taken in connection with the accompanying drawings, in which—

DESCRIPTION OF ILLUSTRATIVE EMBODIMENTS

Figure 1:
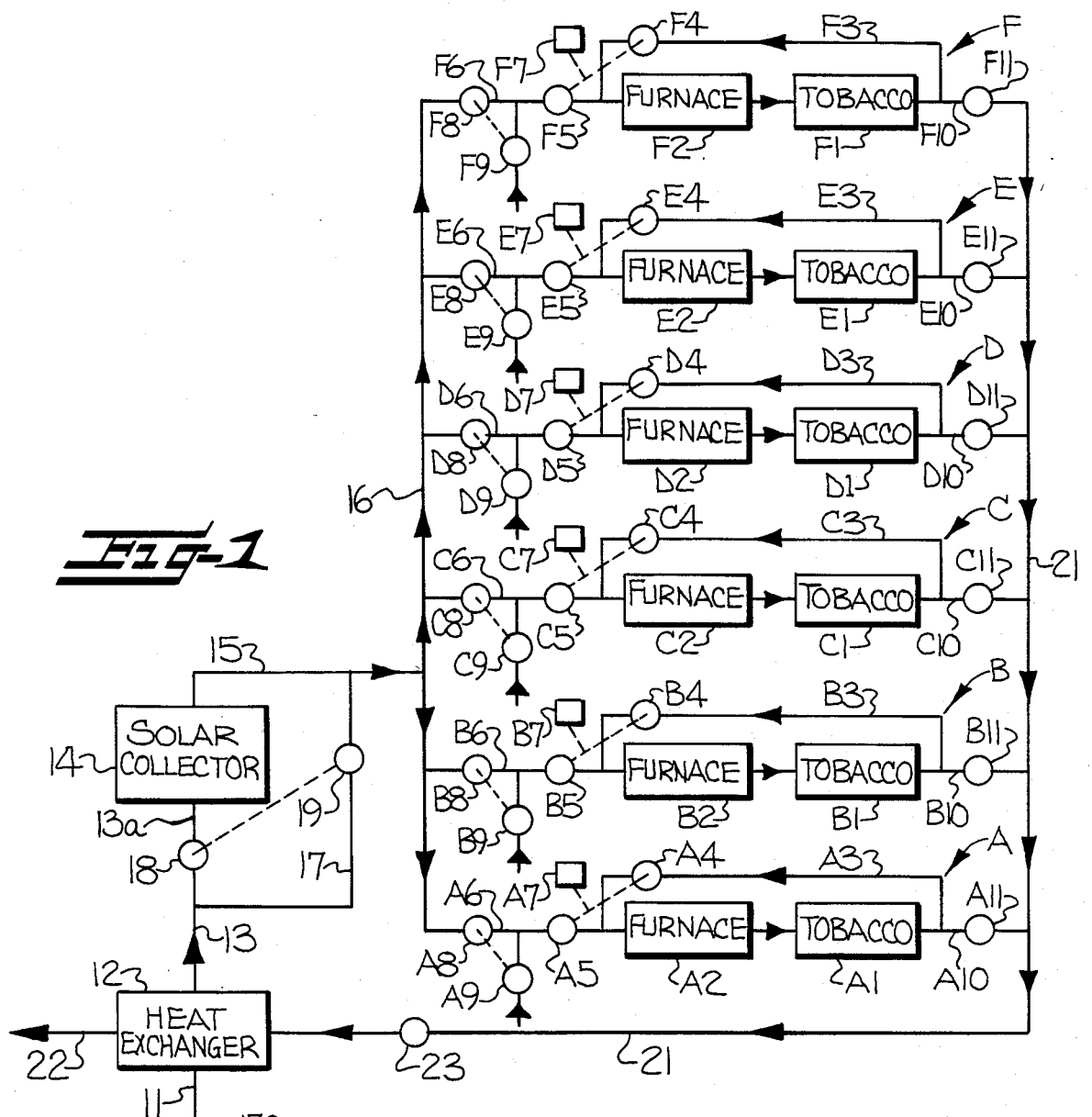
FIG. 1 schematically illustrates a multi-chamber tobacco curing system in accordance with the invention.

The present invention and the manner of making and using the same are illustrated and described herein as applied to certain specific embodiments as required by the Patent Laws. The embodiments illustrated and described herein are merely exemplary of how the present invention can be practiced in connection with the curing of tobacco. They are not intended to limit the invention, as it is recognized that those skilled in the applicable arts will find it possible to reap the benefits and advantages of the present invention by embodiments other than those specifically illustrated and described herein.

By way of background, the curing and drying of bright-leaf (or flue cured) tobacco is conventionally carried out by the "bulk curing" method, in which tobacco leaves are loaded in a relatively compact mass in racks or in containers and placed inside of an enclosed curing barn where a furnace circulates a forced flow of heated air through the tobacco leaves under prescribed conditions of temperature and humidity. The curing process involves several distinct phases. During the first phase, known as yellowing, the tobacco is maintained at a temperature around 95°–105° F. under high relative humidity conditions. These temperature and humidity conditions promote certain chemical reactions in the tobacco leaves which cause the tobacco leaves to turn yellow. After about 36 to 72 hours, when the tobacco has been yellowed sufficiently, the relative humidity in the barn is reduced and the temperature is gradually increased. These conditions fix the color and promote drying of the tobacco leaves. The thin leafy portions of the tobacco leaves become dried first, and later the thicker stem portions are dried. At the end of the drying phase, the curing air temperature is about 165° F. At this point, the furnace burner is stopped and the leaves are allowed to cool to ambient temperature, typically with the air inlet and exhaust vents of the curing chamber open and the furnace fan running. This also serves to partially condition the leaves by restoring a portion of their moisture content. Typically, however the conditioning is accomplished by circulating humid night air through the tobacco leaves, by spraying fine water particles into the recirculating airstream, or by wetting the floor of the barn if necessary.

The total curing time for processing one "batch" of tobacco is generally about 5 to 8 days, depending upon maturity of the freshly harvested leaf. Harvest of the entire crop occurs over a 5–7 week period, with successive batches of tobacco cured in the same barn.

In the conventional curing method described above, considerable heat energy is discharged from the curing barn with the exhaust air during the leaf and stem drying phases of the curing cycle. At the end of curing, when fresh air is forced into and through the system, the heat removed as the leaf and curing barn are cooled to ambient temperature is completely lost. The conditioning of the tobacco is relatively imprecise by the above-noted methods. During dry weather, tobacco is frequently either underconditioned, or overconditioned and wetted with water. In either event, the improperly conditioned tobacco is subject to receiving a reduced price when the tobacco is sold at market.

In the multi-chamber curing system of the present invention, the tobacco is cured in a plurality of individual curing chambers. Each chamber is provided with suitable controls for controlling the temperature and humidity conditions of the curing air which is circulated through the tobacco, and in each chamber the tobacco follows an established curing schedule including a yellowing phase, leaf drying and stem drying phases, and a cool-down and conditioning phase. The curing schedules for the respective chambers are staggered timewise so that the tobacco in one chamber is at different temperature and humidity conditions and at a different stage of cure from the tobacco in the other chambers. Means is provided for recovering the heat energy of the hot moist air exhausted from the respective chambers and for transferring the heat content thereof to the incoming fresh air which is being directed to the respective chambers. A solar collector is also provided for further preheating the incoming fresh air which is directed to the curing chambers.

Referring now more particularly to the drawings, FIG. 1 schematically illustrates the air flow through a multi-chamber tobacco curing system in accordance with the invention. The system shown has six tobacco curing chambers, and tobacco would be harvested on consecutive work days such that one chamber is filled per day, Monday through Saturday. A curing cycle for any given chamber would be completed in one week, including loading the barn, curing, conditioning and unloading.

After the system is in full operation, one or more curing chambers will always be in the leaf or stem drying phase and most of the solar energy received by the solar collector can thus be immediately utilized, thereby eliminating the necessity for energy storage. With the same collector surface area as would be provided in six separate single chamber units, it is estimated that the solar heat recovery is more than doubled. On certain days, collector surface area for use by a given chamber in the drying stage may be 300% or more of that of a single chamber unit. Furthermore, a heat exchanger for recovery of exhaust air which is only twice the size of a single chamber unit can effectively recover heat from six chambers at the same level of effectiveness. Thus, equipment costs per unit of energy saved are considerably reduced for the multi-chamber system of this invention, as compared to what would be achieved from a solar collector and heat recovery system applied to a single chamber unit.

As shown in FIG. 1, fresh air enters the system at an air inlet 11 and passes through a heat exchanger 12 where the fresh inlet air is preheated by the heated moist exhaust air being exhausted from the system. The heat exchanger 12 preferably comprises a parallel plate, counterflow heat exchanger in which the parallel plates define parallel passageways in heat transferring relationship to one another. Incoming fresh air flows through alternate passageways and heated exhaust air flows in counterflow direction through intervening passageways. The preheated fresh inlet air is directed from the heat exchanger 12 along a duct 13 and 13a and to a solar collector 14, of any suitable air heating design, where the air is further preheated by the solar energy received by the collector 14. The preheated air is directed from the solar collector along a duct 15 and to a common inlet plenum 16 for the respective curing chambers. A bypass duct 17 extends between ducts 13 and 15 bypassing the solar collector 14. Dampers 18 and 19 are provided in the duct system so that the inlet air can be directed through the solar collector 14 during sunny periods when solar energy is available for further preheating the air, or for directing the air in bypassing relationship around the solar collector 14 at night to avoid cooling the preheated air as it passes through the solar collector 14 due to radiation heat loss. The dotted lines extending between dampers 18 and 19 indicate that the dampers are interconnected in such a manner that one of the dampers is opened as the other damper is closed.

The respective individual curing chamber units or barns are indicated generally by the reference characters A–F, each such curing chamber unit being substantially identical. To avoid repetition, only one of the units will be described in detail, and corresponding elements in the other units will be identified by corresponding reference characters with a different letter prefix.

As illustrated, each such curing chamber unit has a recirculating air flow arrangement similar to that of a conventional bulk curing barn. The curing chamber unit A includes a tobacco curing chamber A1 adapted for receiving the tobacco leaves disposed in suitable containers or racks as is conventional. A furnace A2, including a fan and a suitable fuel fired burner, is provided upstream of the chamber A1 for directing a forced flow of heated air through the tobacco leaves disposed in the curing chamber A1. The furnace is equipped with an automatic temperature advance thermostat, such as for example, the Reliance Tempatrol automatic advance thermostat, Model AT-25. The heated air, after passing through the tobacco curing chamber A1, can be recirculated back to the furnace along a recirculation duct A3. A damper A4 in the recirculation duct and a damper A5 in a fresh air inlet duct A6 connected to plenum 16 and leading to the furnace A2 permit controlling the proportions of recirculated air and fresh air which are directed through the tobacco curing chamber A1. The broken lines interconnecting dampers A4 and A5 indicate that the dampers are preferably interconnected to as to operate in unison, with one of the dampers opening as the other damper closes. Preferably, a proportional wet bulb damper control A7 is used in association with the dampers A4, A5 for automatically controlling the damper settings during the curing operation. This type of damper control is a readily available item and used for damper control on many conventional single chamber bulk curing barns. By way of example, one suitable such control is the Powell modulating humidity controller No. 10-6046 available from Powell Manufacturing Company of Bennettsville, S.C.

An additional pair of dampers A8 and A9 is associated with the inlet duct A6. The damper A8 receives preheated fresh air from the common inlet plenum 16. The damper A9 receives unheated fresh air from the ambient atmosphere. The dampers A8 and A9 preferably operate in unison, as indicated by the broken lines, to permit adjustably controlling the amount of unheated fresh air or preheated fresh air which is directed along the fresh air inlet duct A6 to the curing chamber A1.

Exhaust air is discharged from the curing chamber A1 along an exhaust duct A10 passing through an adjustable damper A11, the purpose of which will be described hereinafter. The respective exhaust ducts A10-F10 are communicatively connected to a common exhaust air plenum 21. The heated moist exhaust air from the respective curing chambers is collectively received in the common exhaust air plenum 21 and is directed to and through the heat exchanger 12, where heat is transferred to the incoming fresh air. The cooled exhaust air is then exhausted through an exhaust outlet 22. A damper 23 is provided in the common exhaust air plenum 21 for purposes which will be explained hereinafter.

METHOD OF OPERATION

The method of operation of the multi-chamber curing system of this invention will now be described in connection with the six chamber system illustrated in FIG. 1. The curing chambers A1 through F1 would be filled one chamber per day, Monday through Saturday. After filling chamber A1 on Monday, the fan of furnace A2 is energized to circulate air within the chamber. Damper A9 is opened and damper A8 closed, with fresh air admitted as required by modulation of automatic damper A5. The modulating damper control A7 is set so as to maintain relatively high humidity conditions for yellowing, such that the air mostly recirculates through damper A4. Damper A11 operates in cooperation with dampers A4, A5 such that when damper A5 opens to admit more fresh air, damper A4 closes to reduce the amount of recirculated air and damper A11 opens to permit air to be exhausted from the curing chamber. Damper A11 may either be physically connected to the damper A5 by suitable linkage, or may comprise a pressure operated exhaust air damper which opens in response to static pressure when exhaust air is displaced from the curing chamber A1 as a result of introduction of fresh air through damper A5.

During the yellowing stage of curing, there is a relatively low energy requirement. The temperature of air forced through the tobacco should generally be less than 105° F. with a relative humidity between about 80 to 95%. In a well insulated chamber, respiratory heat alone can maintain the desired yellowing temperatures, and there may be the necessity to introduce cooler outside air to prevent temperatures from spontaneously rising excessively, which might damage the leaf or prematurely set the color. Thus, once the desired yellowing temperature and humidity conditions are achieved, operation during yellowing generally does not necessitate the use of preheated air, although it can be used during night or during cool weather or cloudy conditions to slightly improve efficiency at this stage. Wet or very high moisture tobacco may benefit from increased moisture removal during yellowing and some preheated air may be used as desired. Conditions can be controlled by setting dampers A8 and A9 to obtain a blend of ambient temperature air and preheated air at the desired temperature.

On Tuesday, chamber B1 is filled and similarly begins the yellowing stage. This chamber is cool during filling and fan operation is not required until the chamber is completely filled. It, too, operates during yellowing without significant need for preheated air.

On Wednesday, chamber C1 is filled in a similar manner. At this time, chamber A1 is at a stage where preheated air can be utilized, as it has entered the drying phase and temperature is being increased gradually from 100° to 130° F. and with reduced humidity. Damper A8 is now fully opened and damper A9 is closed. Chamber A1 actually has available the complete heat recovery and solar collection system for meeting its own drying needs.

On Thursday, chamber D1 is filled and begins the yellowing stage. At this time, chambers A1 and B1 are both drying and can utilize the preheating system, whereas chambers C1 and D1 are yellowing.

On Friday, chamber E1 is filled. At this time, drying is in the early stem drying phase for chamber A1 with the temperature approximately 150°-160° F. Chamber B1 is in the leaf drying stage at about 120°-130° F., and chamber C1 is near the end of the early leaf drying stage and can use perhaps a small amount of preheated air.

On Saturday, chamber F1 is filled and the other chambers have now progressed further into the cure. At this stage, the tobacco in chamber A1 should be dry or almost dry and should not require additional air intake. The tobacco in chambers B1, C1 and D1 will be utilizing preheated air, with chamber C1 likely requiring the largest volume of fresh air. Chamber E1 will be yellowing.

During this week of operation, thus far, only two or three chambers are at a stage at any given day to effectively utilize heat recovery and solar preheating of the inlet air. Thus, the effect has been to greatly increase the available size of the heat recovery or solar collection surface area as compared with a single chamber operation. During operation, as previously discussed, air admitted to the common inlet plenum 16 can be preheated by the heat exchanger 12 alone, or in combination with the solar collector 14 during times when solar heating is available. Bypassing the solar collector 14 at night, when cooling of the air from the heat exchanger 12 could occur, can be accomplished by manual or automatic control of dampers 18, 19.

Continuing now the discussion of the system operation, the tobacco in chamber A1 has now been completely cured and dried and is at a temperature of about 160° F. The tobacco must now be cooled to ambient temperature to permit emptying the chamber. Additionally, the tobacco must be conditioned by restoring a portion of the original moisture content to the tobacco leaves. In conventional bulk curing systems, the heat energy during cool-down is simply lost to the atmosphere. Conditioning of the cured leaf has involved running the furnace fan with the inlet vents to the chamber open in order to force outside humid air through the tobacco. In some instances, conditioning has been accomplished by the use of spray nozzles which inject a fine water spray mist into the recirculated airstream, or by wetting the floor of the curing chamber. The method and apparatus of the present invention provides for significant energy savings in comparison with the previously noted conventional bulk curing methods in that it is possible to recover and reuse the otherwise lost heat energy during cool-down and it is possible to recover and use the heat of adsorption evolved as moisture is restored to the cured tobacco leaves during conditioning.

Upon completion of the stem drying, on Saturday or Sunday, the temperature within the chamber A1, including the tobacco, curing chambers, etc., is about 160°–170° F. Cool-down and conditioning are conducted as follows: The fan of furnace A2 is de-energized, and the dampers A8, A5, and A11 are placed in the open position while dampers A9, A4, and 23 are closed. Damper 23 may be only partially closed in order to establish a static pressure within the exhaust plenum 21 of about 0.2 to 0.5 inch static pressure (water column). Humid air that is now being exhausted from chambers D1, E1 or F1 which are in the yellowing or leaf drying stages moves through damper A11 of curing chamber unit A and passes in a reverse direction to the normal flow back through the tobacco in chamber A1, through the furnace A2, and through the dampers A5 and A8 to the common inlet plenum 16. Cool-down energy is thus returned by the inlet plenum 16 where it is retained in the system and used immediately by the chambers in the drying stage. Within about one hour, chamber A1 will have cooled to about 105° to 115° F. Condition of the air entering chamber A1 through damper A11 can easily be regulated by slight adjustment of drying temperatures for the chambers which are in the leaf drying stage. Rapid and uniform conditioning occurs at air temperatures between about 90° and 105° F. with a relative humidity of around 80 to 90%. Saturated air at 100% r.h. should not be circulated through the cured leaf; neither, should the air be too dry, say below about 60%, in order to establish leaf moisture levels of about 15 to 18%.

Another important energy element is added back to the system during conditioning, i.e. the heat of adsorption. For a chamber having 2000 pounds of cured leaf, approximately 300 pounds of water are adsorbed. It is estimated, for this quantity of leaf, that over 300,000 btu of energy are evolved during conditioning. This evolved energy is returned in the circulated air to the inlet plenum 16 for reuse by the chambers which are in the leaf drying stage.

It should be noted that the above novel conditioning method is preferably utilized during night periods, when solar preheating of the air is not available. Cool-down energy and heat of adsorption thus reduce energy demands for chambers which are undergoing drying at this time. It should also be noted that conditioning is accomplished without using the fan of furnace A2, thus eliminating the electrical energy otherwise required for running the fan during conditioning. Experiments indicate that cool-down and conditioning can be easily accomplished within about 8 to 12 hours when temperature and humidity conditions are in the stated range.

In some instances, as near the end of the curing season, it may be more suitable to utilize an alternate conditioning method for cured leaf within a chamber without recycling moisture exhausted from another chamber, yet recovering cool-down energy. In this case, the hot exhaust air can be directed along the duct 21 and through the heat exchanger 12 to preheat incoming fresh air. If desired, outside air can be introduced directly to the chamber undergoing cooling through the appropriate damper, A9–F9.

While the multi-chamber curing system of this invention has been illustrated thus far with six chambers, it should be understood that fewer or more chambers would work satisfactorily. Best results will be obtained when chambers are filled at approximately the same time interval, for example, every one, two or three days. Also, more than one chamber could be filled on a given day, for example to speed up harvest schedule for fast ripening tobacco. Normal harvesting schedules, however, would involve filling one chamber per day for a six chamber operation (skipping Sunday), two chambers per day for a ten or twelve chamber operation, one chamber every other day for a three chamber operation, etc.

Figure 2:
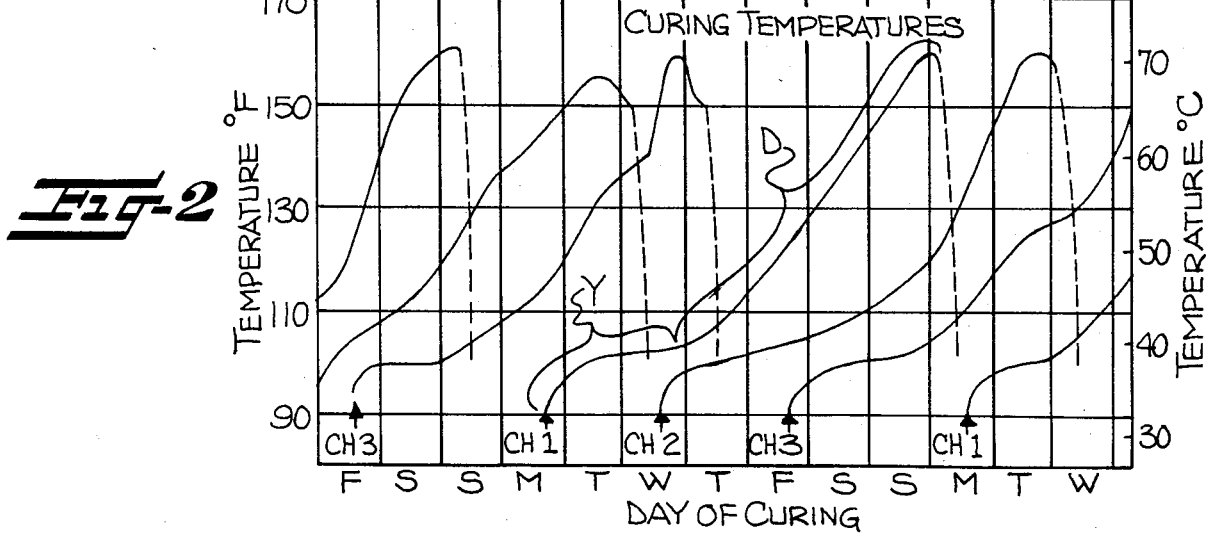
FIG. 2 is a graph showing the relationship of time and curing temperatures in the respective curing chambers of the multi-chamber tobacco curing system.

FIG. 2 is a graph illustrating the relationship of curing temperatures and time for a three-chamber curing system in which the chambers are filled every other day, e.g. Mondays, Wednesdays and Fridays. The portions of the solid line time-temperature curves indicated by the reference character Y represent the yellowing phase of curing, while the portions of the curves indicated at D represent the leaf drying and stem drying phases. It will be seen that at any given time, at least one of the chambers is in the drying phase and can utilize the recovered heat energy and solar energy provided by the curing system. Similarly, during the conditioning phase, indicated by the broken lines, the cool-down energy recovered from the chamber undergoing conditioning can be utilized in the other chambers.

Figure 3:
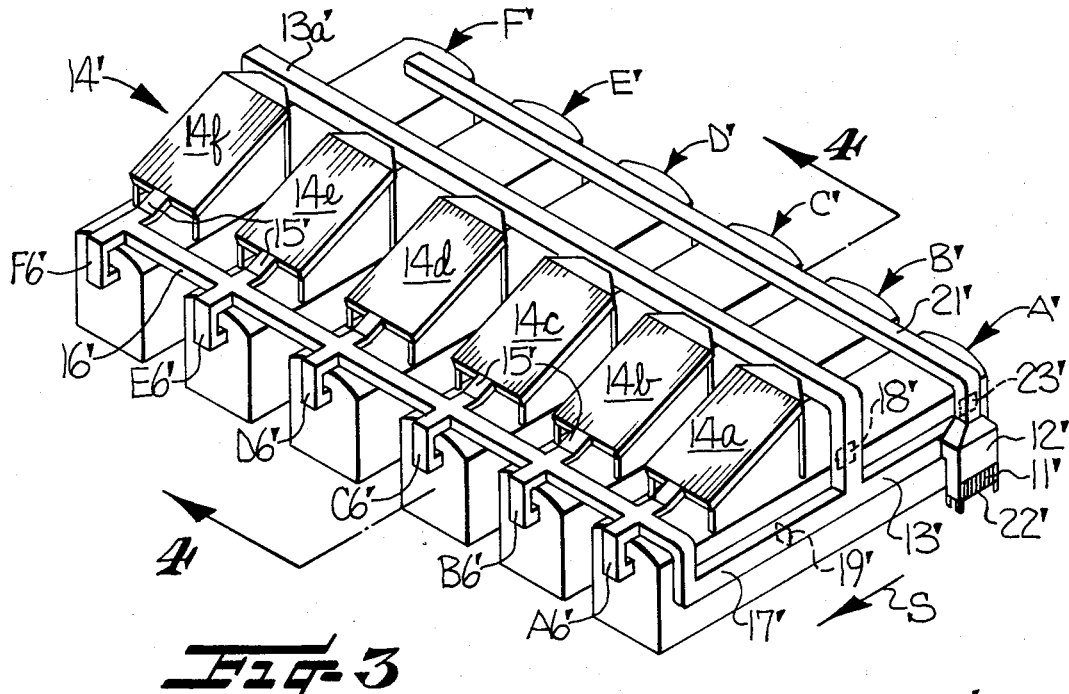
FIG. 3 is a perspective view showing the multi-chamber tobacco curing system of this invention as applied to existing bulk curing barns.
Figure 4:
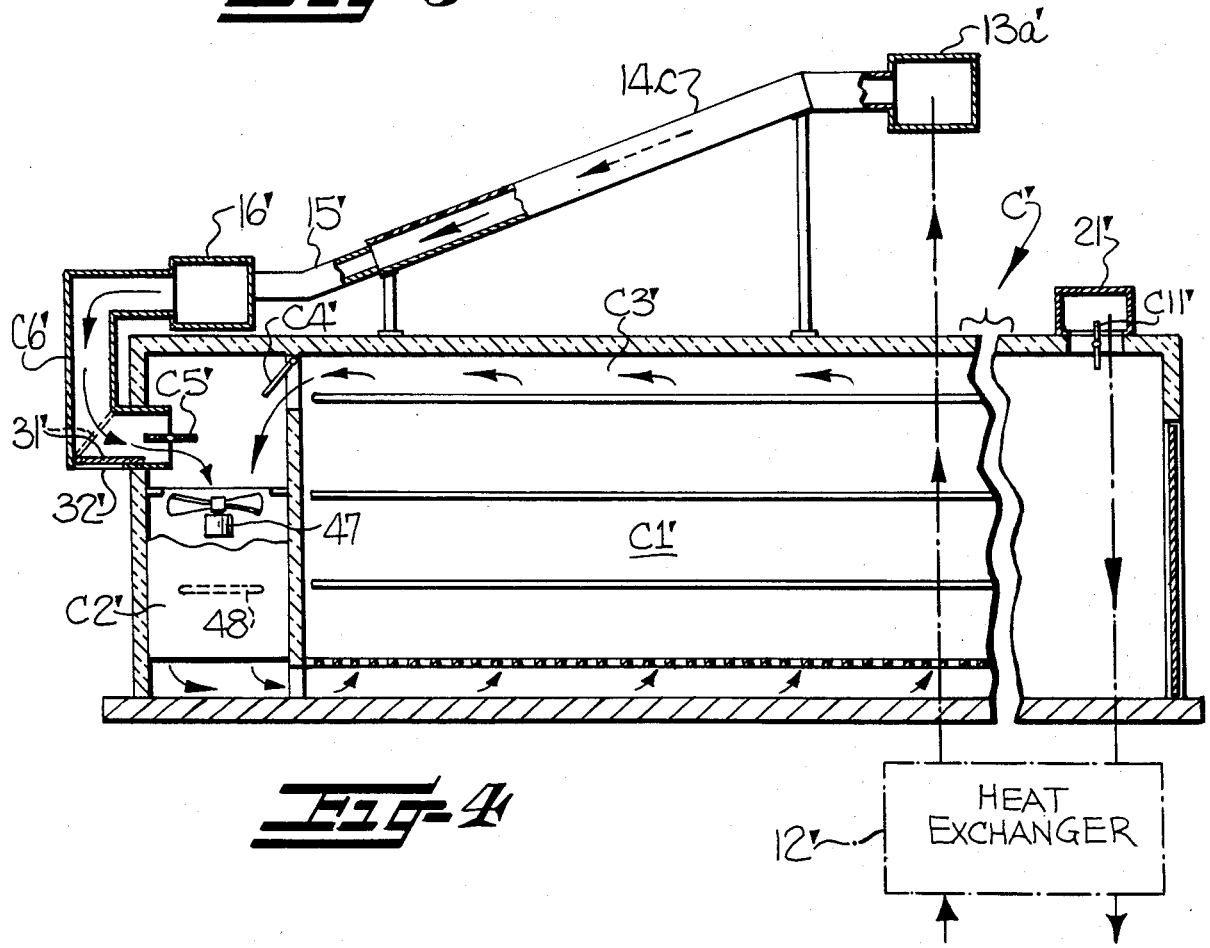
FIG. 4 is a side sectional view through one of the bulk curing barns.

FIGS. 3 and 4 illustrate an arrangement in which the novel principles of the invention can be utilized in a retrofit application to existing bulk curing barns of conventional construction. For ease of understanding, and to avoid repetition, elements of the curing system shown in FIGS. 3 and 4 which correspond to elements previously described in connection with FIG. 1 will, whereever applicable, be identified by the same reference characters used in FIG. 1, with prime notation (') added.

Six bulk curing barns are generally indicated by the reference characters A' to F', respectively. For purposes of orientation, the ends of the barns visible in FIG. 3 represent the furnace end of the barn. The barns are loaded with tobacco through doors (not visible in FIG. 3) provided at the far ends of the barns.

The heat exchanger 12' is located at one side of the endmost barn A'. Fresh air is received in the heat exchanger through inlet 11' located along the lower side of the heat exchanger. The preheated fresh air leaves the heat exchanger 12' and flows along a duct 13' and then along duct 13a' which extends transversely of the row of barns. The solar collector, generally indicated at 14', is defined by a plurality of individual collector panels 14a–14f of suitable air heating design located respectively on the roofs of the barns A'–F'. The fresh air inlet duct 13a' serves as a manifold for supplying air to the respective individual collector panels 14a–14f. The respective panels 14a–14f have respective outlet ducts 15' provided on the lower ends thereof, which in turn are connected to a common inlet plenum 16' extending transversely across the row of barns. Respective inlet ducts A6'–F6' are connected to the common inlet plenum 16' for supplying fresh air to the inlets of the respective furnaces. A bypass duct 17' extends between the duct 13' and the common inlet plenum 16' for bypassing the solar collector panels when solar heating is not available. A common exhaust plenum 21' extends along the row of barns at the opposite end of the barns from the inlet plenum 16', with the exhaust plenum 21' being connected to the heat exchanger 12' at the upper end thereof. The exhaust air is discharged from the heat exchanger 12' from an outlet 22' located in the bottom thereof.

FIG. 4 shows a cross-sectional view through one of the bulk curing barns C'. The curing chamber C1' is adapted for receiving the tobacco in suitable racks or containers as is conventional. The furnace C2' circulates heated air into the curing chamber beneath the tobacco, with the heated air circulating upwardly through the tobacco and returning to the furnace via the recirculation duct or passageway C3'. Damper C4' is located in the wall 30' separating the curing chamber C1' from the furnace area C2'. The damper C5' which controls the amount of fresh air entering the furnace is located in the inlet duct C6'. A single pivotal damper 31' serves the functions of dampers C8, C9 of FIG. 1. This damper is movable from a first position blocking the flow of air from the duct C6' and leaving an opening 32' for admitting fresh air to a second position wherein the opening 32' is blocked and the flow path along the duct C6' is open. The exhaust air damper C11' is located in the roof of the curing barn where the exhaust duct 21' extends thereacross, and is pivotally mounted so as to move between an open and closed position selectively providing communication between the duct 21' and the interior of the curing chamber C1'.

Figure 5:
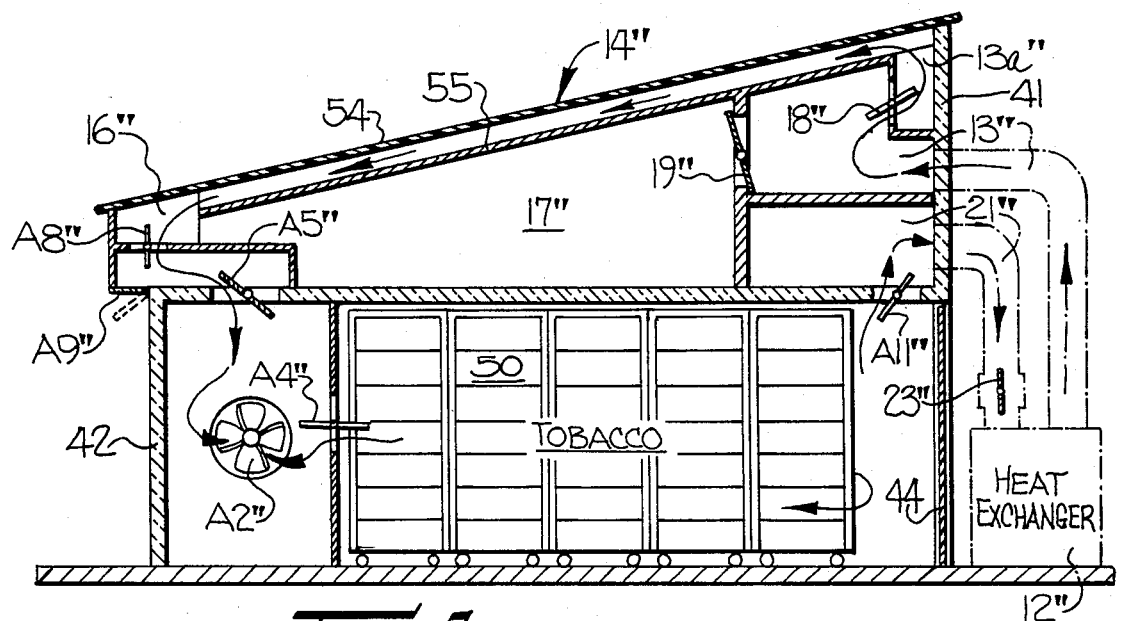
FIG. 5 is a side cross-sectional view through one curing chamber of a unitary multi-chamber curing facility in accordance with this invention.
Figure 6:
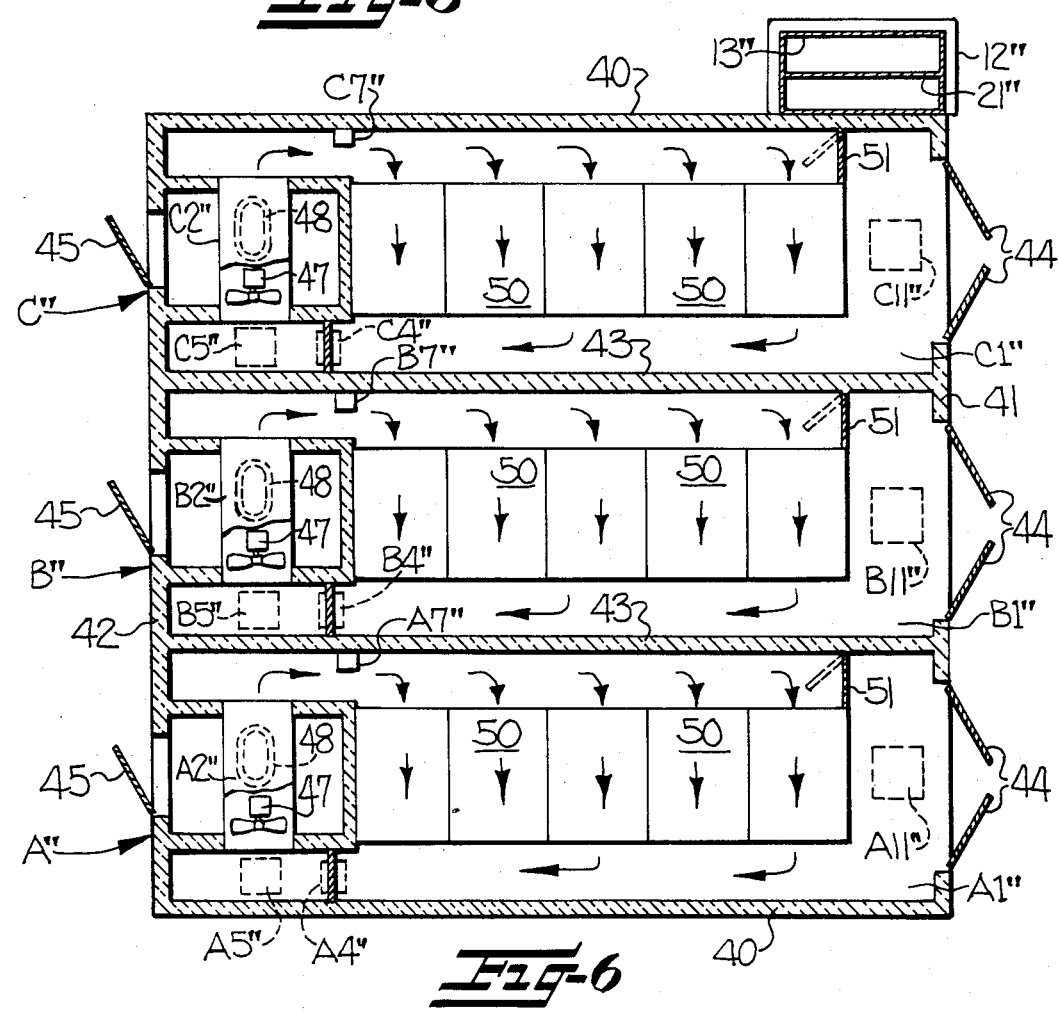
FIG. 6 is a cross-sectional plan view thereof.

FIGS. 5 and 6 illustrate how the principles of this invention can be utilized in a unitary multi-chamber facility having common walls between chambers. For a three-chamber system, the chambers would be filled on alternate days, e.g. Monday, Wednesday and Friday, to even out energy demand and to permit use of the conditioning method throughout the harvest season. Experimental tests conducted on a three-chamber system similar to that illustrated have demonstrated that fuel energy requirements were reduced in the range of 2,500 to 4,500 btu per pound. This represents from about 60 to 75% reduction in fuel requirements in comparison with conventional bulk curing systems.

For clarity and to avoid repetition, elements of the curing system shown in FIGS. 5 and 6 which correspond to elements previously described in connection with FIG. 1 will, whereever applicable, be identified by the same reference characters as those used in FIG. 1, with double prime (") notation added. Referring now more particularly to the unitary multi-chamber facility illustrated in FIGS. 5 and 6, the apparatus is comprised of insulated side walls 40, and insulated front and rear walls 41, 42 respectively which collectively define a generally rectangular enclosure. Insulated interior walls 43 extend from the front walls 41 to the rear walls 42 and define within the building a series of separate curing chamber units, three being specifically illustrated in the drawing and indicated at A", B", C", it being understood that a larger number of curing chamber units could be provided. Doors 44 are provided in the front wall 41 to provide access to the respective tobacco chambers A1", B1", C1" for loading and unloading. A furnace room is provided adjacent the rear of each chamber and doors 45 in the rear wall 42 provide access to the furnace room for servicing. Each chamber is equipped with a separate furnace A2", B2", C2", including a fan 47 and a direct fired natural gas burner 48. A commercially available automatic temperature advance thermostat controls the on-off operation of the furnace so as to maintain the temperature in the curing chamber at a predetermined dry bulb temperature depending upon the curing schedule and stage of cure. The humidity levels in the curing chambers are controlled by dampers A4", A5", B4", B5", C4", C5". A commercially available wet bulb modulating humidity controller A7", B7", C7" is provided for adjusting the damper so as to maintain the humidity level in the curing chamber at a predetermined wet bulb temperature.

The curing chambers are of a crossflow configuration. The tobacco is loaded into suitable curing containers 50 and the curing containers 50 are arranged within the curing chamber in contiguous relation as illustrated. An inlet plenum door 51 is closed to thereby provide for air circulation horizontally through the curing containers 50 and between the vertically oriented tobacco leaves disposed therein. A common inlet plenum 16" and a common exhaust plenum 21" extend laterally of the apparatus above the curing chambers and communicate with each curing chamber as seen in FIG. 5. The duct 13" and the exhaust plenum 21" are connected to a parallel plate, counterflow heat exchanger 12" located on the outside wall of the curing system building.

The solar collector 14" is shown as built into the roof of the building, with air channels being formed between adjacent roof rafters. The outer roof surface 54 is formed of a sheet material having high solar energy transmittance. The underlying absorber plate 55 is formed of a suitable sheet material, such as plywood or sheet metal, painted flat black. The roof collector surface is inclined from the horizontal and oriented toward the south for best exposure of the sun.

It is to be understood that the principles discussed herein for energy reduction in tobacco curing could similarly be applied to the drying of multiple batches of corn, peanuts and other moisture containing materials which are harvested on a regular basis. For example, a multiple-bin corn drying installation, where each bin is filled on a staggered basis every 2 or 3 days, could equally benefit from the disclosed integrated heat recovery and solar preheat system with full recovery of cool-down energy and heat of adsorption. Current energy requirements of about 1800 btu/lb of water removed during corn drying should conservatively be reduced to 900 btu/lb, based on energy requirements for drying tobacco with the disclosed system.

In the drawings and specification, there have been set forth preferred embodiments of the invention and although specific terms are employed, they are used in a generic and descriptive sense only and not for purposes of limitation.

That which is claimed is:

1. A method for more economically drying a moisture-containing material, such as tobacco, by a flow of heated air, said method comprising
circulating air through a first treatment chamber loaded with the material to be dried to drive off moisture from the material while heating in accordance with a drying schedule in which the temperature of the air is gradually increased as the material becomes drier and while discharging the thus heated and humid air from the treatment chamber, receiving the heated humid air from the first treatment chamber and transferring heat therefrom to a separate stream of air so as to thereby preheat the separate stream of air, and circulating at least a portion of the thus preheated separate stream of air through at least one additional treatment chamber loaded with material to be dried to drive off moisture from the material, while heating the air in accordance with a drying schedule in which the temperature of the air is gradually increased as the material becomes drier, and wherein the drying schedules for the respective treatment chambers are staggered timewise so that the material in the respective chambers is at different stages of drying and at different temperatures at any given time, whereby the fuel required for heating and drying the material in said at least one additional treatment chamber is significantly reduced.

2. A method as set forth in claim 1 including the further step of directing the preheated separate stream of air during its course of travel to said at least one additional treatment chamber through a solar collector and further preheating the air so as to thereby further reduce the fuel required for heating and drying the material.

3. A method for more economically curing and drying a moisture containing material, such as tobacco, by a flow of heated air, said method comprising (a) circulating heated air, under controlled conditions of temperature and humidity in accordance with an established curing schedule, through a first treatment chamber loaded with the material until the material has been sufficiently cured and dried, (b) then circulating cooler, more humid air through the treatment chamber to thereby cool the heated material and restore a portion of the original moisture content thereof and whereby the cooler, more humid air is heated due to heat transfer from the material and the heat of absorption which is evolved as moisture is restored to the material, and (c) discharging the air thus heated by step (b) from the treatment chamber and directing the heated air through material disposed in at least one additional treatment chamber while also heating the air, whereby the fuel required in curing and drying the material in said at least one additional treatment chamber is significantly reduced.

4. In a method for curing tobacco in which air, under controlled conditions of temperature and humidity, is directed in a recirculating flow path through a batch of tobacco leaves disposed in a curing chamber, with the air being heated as necessary by a furnace, and with the humidity conditions in the curing chamber being controlled by selectively admitting fresh air to the recirculating flow of air through the curing chamber while discharging exhaust air, the combination therewith of an improvement characterized by substantially reducing the fuel costs for curing the tobacco, said improvement comprising carrying out said curing method concurrently for a series of batches of tobacco in respective individual curing chambers, collecting and combining the flows of heated exhaust air discharged from the respective curing chambers and transferring heat therefrom to a stream of incoming fresh air to thereby preheat the fresh air, and supplying the thus preheated stream of fresh air to at least one of the respective curing chambers.

5. The method as set forth in claim 4 or 1 including the additional step of directing the preheated fresh air through a solar collector for further preheating the fresh air prior to supplying the fresh air to at least one of the respective curing chambers.

6. The method as set forth in claim 5 wherein said step of directing the preheated fresh air through a solar collector is carried out only during periods when sufficient solar energy is available for further preheating the fresh air, and during the periods when solar energy is not available, carrying out the further step of directing the preheated fresh air in bypassing relationship around the solar collector so as to thus avoid cooling of the preheated fresh air.

7. The method as set forth in claim 4 including the further steps, performed when the tobacco in one of said chambers has been sufficiently cured and dried, of cooling and conditioning the cured and dried tobacco by directing a flow of moist, cooler air through the batch of tobacco and recovering the heat energy from the batch of tobacco as it is cooled and the heat adsorption which is evolved as moisture is restored to the tobacco leaves in said batch and transferring this heat energy to another batch of tobacco then undergoing curing and drying.

8. The method as set forth in claim 7 wherein said step of directing a flow of moist, cooler air through the batch of tobacco and recovering heat energy comprises directing at least a portion of the exhaust air collected and combined from the respective chambers through the batch of tobacco in said one chamber so as to transfer heat energy from the batch of tobacco to said flow of air while cooling and conditioning the tobacco, and said step of transferring this heat energy to another batch of tobacco comprises directing the flow of thus heated air from said one chamber directly into another batch of tobacco for thus transferring the heat energy thereto.

9. The method as set forth in claim 7 wherein said step of directing a flow of moist cooler air through the batch of tobacco and recovering heat energy comprises directing a flow of moist ambient fresh air through the batch of tobacco in said one chamber so as to transfer heat energy from the batch of tobacco to said flow of air while cooling and conditioning the tobacco, and said step of transferring this heat energy to another batch of tobacco comprises combining the flow of thus heated air from said one chamber with heated exhaust air discharged from the other curing chamber and directing the combined flows of heated exhaust air through a heat exchanger while also directing a stream of incoming fresh air through the heat exchanger for being preheated by the heat of the exhaust air.

10. In a method for curing tobacco in which air, under controlled conditions of temperature and humidity, is directed in a recirculating flow path through a batch of tobacco leaves disposed in a curing chamber, with the air being heated as necessary by a furnace, and with the humidity conditions in the curing chamber being controlled by selectively admitting fresh air to the recirculating flow of air through the curing chamber while discharging exhaust air, said curing method following an established curing schedule in which the tobacco first undergoes a yellowing phase wherein the air is maintained at a temperature of about 95°–105° F. with high air recirculation and relative humidity to promote yellowing of the tobacco leaves, the tobacco thereafter undergoing a drying phase in which the relative humidity is reduced by admitting fresh air and discharging humid exhaust air and while gradually increasing the temperature of the air to about 165° F. to promote drying of the tobacco, the combination therewith of an improvement characterized by substantially reducing the fuel costs for curing the tobacco, said improvement comprising carrying out said curing method concurrently for a series of batches of tobacco in respective individual curing chambers, each being provided with its own furnace, while beginning the curing schedule for each respective batch in the series at a different time so that the batches of tobacco are at different phases of cure and at different conditions of temperature and humidity at any given time, with at least one batch being in the yellowing phase while at least one other batch is in the drying phase, collecting and combining the flows of heated exhaust air discharged from the respective curing chambers and directing the combined flows through a heat exchanger while also directing a stream of incoming fresh air through the heat exchanger for being preheated by the heat of the exhaust air, and supplying the thus preheated stream of fresh air to at least one of the respective curing chambers to thereby reduce the fuel requirements of the individual furnaces.

11. The method as set forth in claim 10 including the further steps, performed when the tobacco in one of said chambers has been sufficiently cured and dried, of discontinuing the operation of the furnace in said one chamber and circulating air exhausted from the other chambers through the batch of tobacco in said one chamber in a reverse direction to the normal direction of air flow, and cooling the tobacco in said one chamber by said circulating air while transferring to the circulating air the heat energy from the batch of tobacco as it is cooled and the heat of adsorption which is evolved as moisture is restored to the tobacco leaves in said batch, discharging the thus heated circulating air from the fresh air inlet of said one chamber and directing the discharged air to the other curing chambers then undergoing drying whereby the heat energy of the tobacco in said one chamber and the heat of adsorption evolved therefrom in recovered and reused in heating the tobacco in the other chambers.

12. In a method for curing tobacco in which heated air is circulated through a batch of tobacco leaves to cure and dry the leaves, and wherein the cured and dried leaves are thereafter cooled and a portion of the original moisture content is restored to the tobacco leaves, the improvement which comprises recovering the heat of adsorption which is evolved as the moisture is restored to the tobacco leaves in said batch and transferring this recovered heat to another batch of tobacco leaves which is then undergoing curing and drying.

13. In a method for curing tobacco in which heated air is circulated through a batch of tobacco leaves to cure and dry the leaves, and wherein cooler air is thereafter circulated through the batch of tobacco leaves to cool the tobacco leaves, the improvement which comprises recovering heat energy from the air which is circulated through the batch of leaves for cooling and transferring a substantial portion of this recovered heat energy to another batch of leaves which is then undergoing curing and drying.

14. An apparatus for drying a moisture-containing material, such as tobacco, with a flow of heated air which is circulated into contact with the material, said apparatus being constructed so as to permit recovery and reuse of otherwise wasted heat utilized in the drying of the material, and said apparatus comprising
a plurality of chambers, each adapted for receiving the material to be dried, and each chamber having an air inlet and an air outlet for permitting a flow of air through the chamber,
heating means cooperating with each of said chambers for directing a flow of heated air into contact with the material disposed therein,
a common exhaust plenum communicatively connected to the air outlet of each of said chambers for receiving heated exhaust air from the respective chambers,
a common inlet plenum communicatively connected to the air inlet of each of said chambers for supplying fresh air to the respective chambers, and
means connected to said inlet plenum and to said outlet plenum and operable for recovering otherwise wasted heat from the heated exhaust air in said outlet plenum and for transferring the heat to the fresh air in said inlet plenum to thereby reduce the heating requirements of the respective individual heating means.

15. An apparatus as set forth in claim 14 wherein said means for recovering otherwise wasted heat from the heated exhaust air comprises a heat exchanger having first passageways communicating with said common exhaust plenum for receiving the flow of heated exhaust air therethrough and second passageways communicating with said common inlet plenum for receiving the flow of fresh air therethrough, said second passageways being located in heat transferring relation to said first passageways so that the fresh air in said second passageways is heated by the heated exhaust air passing through said first passageways.

16. An apparatus as set forth in claim 15 additionally including solar collector means cooperating with said common inlet plenum for heating the fresh air being supplied to the respective chambers.

17. An apparatus as set forth in claim 16 wherein said solar collector means is located between the respective chambers and said heat exchanger so that the solar collector means serves to receive the fresh air which has been previously preheated by said heat exchanger and for further preheating such air.

18. An apparatus as set forth in claim 17 including means for selectively directing the fresh air in said inlet plenum in bypassing relationship around said solar collector means.

19. An apparatus as set forth in claim 14 including respective adjustable fresh air damper means associated with each of said chambers and communicating with the ambient atmosphere for selectively admitting ambient temperature fresh air into the flow of air being directed through the respective chamber.

20. An apparatus as set forth in claim 14 wherein said heating means comprises respective individual furnaces cooperating with each of said chambers for directing air at an individually selected predetermined temperature through the respective chambers.

21. An apparatus for drying a material, such as tobacco, with a flow of heated air which is circulated into contact with the material, said apparatus being constructed so as to permit recovery and reuse of otherwise wasted heat utilized in the drying of the material, said apparatus comprising
a plurality of chambers, each adapted for receiving the material to be dried, and each chamber having an air inlet and an air outlet for permitting a flow of air through the chamber, means defining respective air passageways communicating with the inlet and outlet of each chamber for directing air from said outlet to said inlet so as to be recirculated through the chamber, respective furnace means cooperating with the air passageway for each chamber for directing a forced flow of heated air at an individually selected predetermined temperature along said air passageway and into and through said chamber and into contact with the material disposed therein, respective damper means associated with each of said passageways and including an inlet for fresh air and means for controlling the amount of fresh air which is admitted to said passageway and the amount of air which is recirculated from said outlet to said inlet for thereby varying the humidity conditions in the chamber, a common exhaust plenum communicatively connected to the air outlet of each of said chambers for receiving heated exhaust air from the respective chambers, a common inlet plenum communicatively connected to the inlet of said damper means for each chamber for supplying fresh air to the respective chambers, and heat exchanger means connected to said inlet plenum and to said outlet plenum and operable for recovering the otherwise wasted heat value of the heated exhaust air in said outlet plenum and for transferring the heat value to the fresh air in said inlet plenum to thereby reduce the fuel requirements of the respective individual heating means.

22. An apparatus as set forth in claim 21 including a modulating wet bulb damper controller cooperating with each of said damper means and operable so as to control the amount of fresh air which is admitted for maintaining a predetermined substantially uniform wet bulb temperature.

23. A tobacco bulk curing system constructed so as to permit recovery and reuse of the heat utilized in the curing operation, said tobacco bulk curing system comprising a series of tobacco bulk curing barns arranged in substantially side-by-side relation to one another, each of said bulk curing barns including a tobacco curing chamber adapted for receiving tobacco leaves for curing and having an inlet and an outlet for permitting a flow of air through the chamber, means defining an air passageway communicating with the inlet and outlet of the curing chamber for directing air from said outlet to said inlet for being recirculated through the curing chamber, furnace means cooperating with said air passageway for directing a forced flow of heated air at an individually selected predetermined temperature along said passageway and into and through the curing chamber and into contact with the tobacco leaves disposed therein for thereby curing and drying the tobacco leaves, damper means cooperating with said air passageway and including an inlet for fresh air and means for controlling the amount of fresh air which is admitted to said passageway and the amount of air which is recirculated from said outlet to said inlet for thereby varying the humidity conditions inside the curing chamber, and an exhaust outlet for the discharge of heated exhaust air from the curing chamber when fresh air is admitted, a common exhaust plenum communicatively connected to the exhaust outlet of each of said curing chambers of said series of barns for receiving heated exhaust air from the respective chambers, a common inlet plenum communicatively connected to the inlet of each of said damper means of said series of barns for supplying fresh air to the respective curing chambers, and a heat exchanger cooperating with said inlet plenum and said outlet plenum and including first passageways communicatively connected to said outlet plenum for receiving the flow of heated exhaust air therefrom, and second passageways communicatively connected to the inlet end of said inlet plenum for receiving the flow of fresh air which is drawn into the inlet plenum, said second passageways being positioned in heat transferring relation with said first passageways so that the fresh air passing through said passageways is heated by the heated exhaust air in said first passageways.

24. A tobacco bulk curing system constructed so as to permit recovery and reuse of the heat utilized in the curing operation said tobacco bulk curing system comprising a building having exterior walls and a roof defining an enclosed space, and having series of spaced apart interior walls dividing the enclosed space into a plurality of individual tobacco curing chambers, each adapted for receiving tobacco leaves for curing, each tobacco curing chamber including means defining an inlet and an outlet for permitting a flow of air through the chamber, means defining an air passageway communicating with the inlet and outlet of the curing chamber for directing air from said outlet to said inlet for being recirculated through the curing chamber, furnace means cooperating with said air passageway for directing a forced flow of heated air at an individually selected predetermined temperature along said passageway and into and through the curing chamber and into contact with the tobacco leaves therein for thereby curing and drying the tobacco leaves, damper means cooperating with said air passageway and including an inlet for fresh air and means for controlling the amount of fresh air which is admitted to said passageway and the amount of air which is recirculated from said outlet to said inlet for thereby varying the humidity conditions inside the curing chamber, and an exhaust outlet for the discharge of heated exhaust air from the curing chamber when fresh air is admitted, a common exhaust plenum communicatively connected to the exhaust outlet of each of said curing chambers of said series of barns for receiving heated exhaust air from the respective chambers, a common inlet plenum communicatively connected to the inlet of each of said damper means of said series of barns for supplying fresh air to the respective curing chambers, and a heat exchanger cooperating with said inlet plenum and said outlet plenum and including first passageways communicatively connected to said outlet plenum for receiving the flow of heated exhaust air therefrom, and second passageways communicatively connected to the inlet end of said inlet plenum for receiving the flow of fresh air which is drawn into the inlet plenum, said second passageways being positioned in heat transferring relation with said first passageways so that the fresh air passing through said passageways is heated by the heated exhaust air in said first passageways.

25. An apparatus as set forth in any one of claims 21, 23 or 24 including respective inlets for ambient temperature fresh air communicating with the ambient atmosphere and connected to the inlet side of each of said chambers, and respective fresh air dampers associated therewith for selectively admitting ambient temperature fresh air into the flow of preheated fresh air flowing to said passageway.

26. An apparatus as set forth in any one of claims 21, 23 or 24 additionally including solar collector means communicatively connected to said inlet plenum and located between the respective chambers and said heat exchanger means and operable for further heating the fresh air which has been previously preheated by said heat exchanger.

27. An apparatus as set forth in claim 26 including means for selectively directing the fresh air which has been previously preheated by said heat exchanger in bypassing relationship around said solar collector means.

28. A method for more economically drying a moisture-containing material, such as tobacco, by a flow of heated air, said method comprising circulating air through a first treatment chamber loaded with the material to be dried while heating the air to drive off moisture from the material and while discharging the thus heated and humid air from the treatment chamber, receiving the heated humid air from the first treatment chamber and transferring heat therefrom to a separate stream of air so as to thereby preheat the separate stream of air, circulating at least a portion of the thus preheated separate stream of air through at least one additional treatment chamber loaded with material to be dried while also heating the air to drive off moisture from the material, and, including the further steps, performed when the material in said first treatment chamber has been sufficiently dried, of discontinuing said heating of the air and circulating cooler air through the first treatment chamber so as to thereby cool the material therein to facilitate handling, while receiving the air which is circulated through the first chamber and which is heated as the material therein is cooled and directing the heated air to said at least one additional treatment chamber whereby heat energy of the material in said first chamber is recovered and reused in heating the material in said at least one additional treatment chamber.

29. In a method for curing tobacco in which air, under controlled conditions of temperature and humidity, is directed in a recirculating flow path through a batch of tobacco leaves disposed in a curing chamber, with the air being heated as necessary by a furnace, and with the humidity conditions in the curing chamber being controlled by selectively admitting fresh air to the recirculating flow of air through the curing chamber while discharging exhaust air, the combination therewith of an improvement characterized by substantially reducing the fuel costs for curing the tobacco, said improvement comprising carrying out said curing method concurrently for a series of batches of tobacco in respective individual curing chambers, with the curing schedules for the respective batches of tobacco being staggered timewise so that the batches are at different stages of cure and at different conditions of temperature and humidity at any given time, collecting and combining the flows of heated exhaust air discharged from the respective curing chambers and transferring heat therefrom to a stream of incoming fresh air to thereby preheat the fresh air, and supplying the thus preheated stream of fresh air to a least one of the respective curing chambers.

30. In a method for curing tobacco in which air, under controlled conditions of temperature and humidity, is directed in a recirculating flow path through a batch of tobacco leaves disposed in a curing chamber, with the air being heated as necessary by a furnace, and with the humidity conditions in the curing chamber being controlled by selectively admitting fresh air to the recirculating flow of air through the curing chamber while discharging exhaust air, the combination therewith of an improvement characterized by substantially reducing the fuel costs for curing the tobacco, said improvement comprising carrying out said curing method concurrently for a series of batches of tobacco in respective individual curing chambers, while selectively admitting fresh air to the respective curing chambers in response to the wet bulb temperature in the individual curing chambers so as to maintain a predetermined substantially uniform wet bulb temperature in each curing chamber, collecting and combining the flows of heated exhaust air discharged from the respective curing chambers and transferring heat therefrom to a stream of incoming fresh air to thereby preheat the fresh air, and supplying the thus preheated stream of fresh air to at least one of the respective curing chambers.

* * * * *